Sept. 8, 1959  F. M. STRONG ET AL  2,903,455
6-(FURFURYL)-AMINOPURINE
Filed March 31, 1955
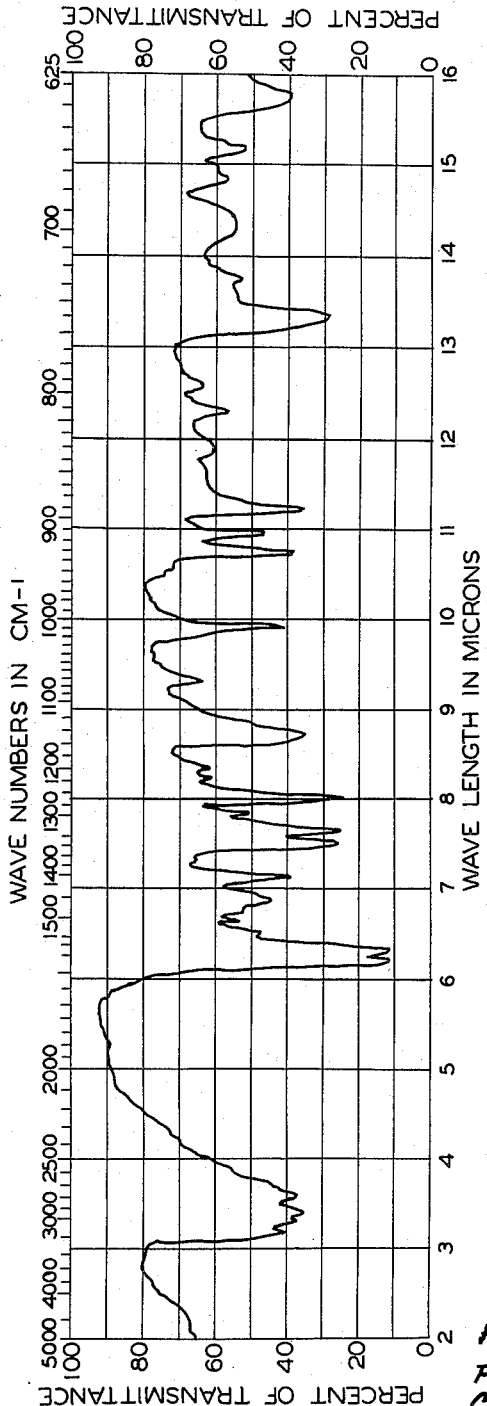
INVENTORS
Frank M. Strong,
Folke Skoog,
Carlos O. Miller
BY Adams, Forward & McLean
ATTORNEYS

United States Patent Office 2,903,455
Patented Sept. 8, 1959

2,903,455
6-(FURFURYL)-AMINOPURINE

Frank M. Strong, Folke Skoog, and Carlos O. Miller, Madison, Wis., assignors to Wisconsin Alumni Research Foundation, Madison, Wis., a corporation of Wisconsin Application March 31, 1955, Serial No. 498,350

1 Claim. (Cl. 260—252)

The present invention is directed to the compound represented by the following formula:

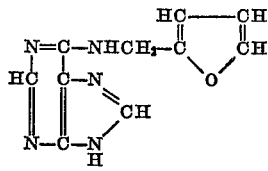

This compound 6-(furfuryl)-aminopurine, and which we have termed kinetin, was first prepared by the following process.

Example I

A relatively fresh commercial batch of deoxyribonucleic acid (DNA) was slurried in water and the resulting slurry (pH 4.3) autoclaved at 15 lbs. for about 30–60 minutes. The aqueous solution adjusted to a pH of 9.3 with NaOH was extracted with diethyl ether to remove kinetin and the ether removed under reduced pressure. The kinetin in 2 N HCl was then put on a cation exchange resin (Dowex 50) column and eluted with 2 N HCl. The pooled active fractions were next run in a similar manner on a similar column and after washing with water, the kinetin was readily eluted with 1 N $NH_4OH$. The resulting solution was adjusted to pH 9.3 with HCl and the precipitate formed washed with water and then crystallized from absolute ethanol to give colorless platelets which sublimed at 220° C. (hot stage), M.P. 266–267° C. (sealed tube). Calcd. for $C_{10}H_9N_5O$: C, 55.81; H, 4.22; N, 32.55. Found C, 56.06, 56.13; H, 4.09, 4.16; N, 32.55, 32.58. Electrometric titration in 1:1 ethanol: water showed $pK_{a1}$ 2.7±0.2, $pK_{a2}$ 9.9±0.2, N.E. (based on $pK_{a2}$) 223±15. The ultraviolet spectrum showed a single band, $\lambda_{max}^{EtOH}$ 268 m$\mu$, $\epsilon$ 18,650, $\lambda_{min}^{EtOH}$ 233 m$\mu$, $\epsilon$ 3,210

The infrared spectrum measured in a KBr pellet showed strong bands at 3.20, 3.30, 3.40, 3.59, 6.20, 6.30, 6.88, 7.12, 7.50, 7.64, 8.01, 8.72, 9.91, 10.7, 11.0, 11.2 and 13.3$\mu$ as illustrated in the accompanying drawing.

Example II

Kinetin was synthesized by the following procedure.

A mixture of 1.66 g. (0.01 mole) of 6-methylmercaptopurine and 2.91 g. (0.03 mole) of furfurylamine was refluxed for about 5–7 hours. (The furfurylamine which boils at about 145° C. acts as a solvent for the alkylmercaptopurine). At the end of the refluxing period, the reaction flask had some liquid in the bottom and some solid material (tarry-type along with some crystalline-type materials) on the sides of the flask. This solid material was removed and treated several (2–3) times with small amounts (5–10 ml.) of warm ethanol. This treatment removed most of the tarry material. The crude granular material remaining after separation from the ethanol was then dissolved in a large volume (400–500 ml.) of boiling ethanol, decolorizing active charcoal added, the solution filtered and allowed to cool. The crystalline precipitate obtained by this procedure was recrystallized from ethanol and corresponded to the 6-(furfuryl)-aminopurine product obtained in Example I.

The compound of the present invention can be used to influence cell division in plants. Kinetin, for example, when added in amounts of about 100 gamma (0.1 m.)/liter with adenine and like compositions for inducing bud formation (see Skoog Patent 2,653,087) will result in the formation of additional buds. Kinetin when added in small amounts (0.1 mg./liter) to auxins such as indoleacetic acid (IAA) also results in increased root growth. For bud formation, the use of about 100–1000 gamma of kinetin with 20–80 mg. of adenine per liter of aqueous nutrient medium is satisfactory with about 100–200 gamma of kinetin to about 40 mg. of adenine being generally preferred. For root formation, the use of similar or larger amounts of kinetin with smaller amounts (0.1–10 mg. per liter) of auxins such as indoleacetic acid is preferred. Kinetin added in small amounts to the compositions described in the Skoog patent, supra, results in improved bud and root formation.

We claim:
The compound 6-(furfuryl)-aminopurine.

References Cited in the file of this patent

UNITED STATES PATENTS

| | | |
|---|---|---|
| 2,392,518 | Barnhill | Jan. 8, 1946 |
| 2,455,396 | Adams et al. | Dec. 7, 1948 |
| 2,515,116 | Dudley | July 11, 1950 |
| 2,653,087 | Skoog | Sept. 22, 1953 |
| 2,691,654 | Hitchings et al. | Oct. 12, 1954 |

OTHER REFERENCES

Miller et al.: Journal American Chem. Soc., vol. 77, pp. 2662–2663 (1955).

Miller et al.: Journal American Chem. Soc., vol. 77, p. 1392 (1955).

Elison et al.: "J. Biol. Chem.," vol. 192, pp. 505–518 (1951).